May 26, 1936.    V. W. PETERSON    2,042,186
VALVE CONSTRUCTION
Filed July 13, 1932
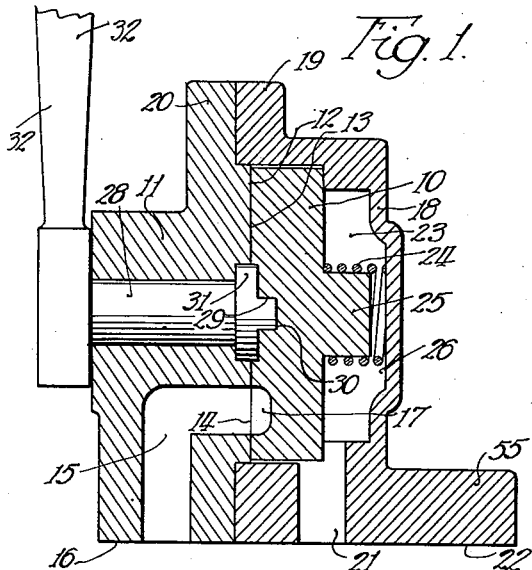
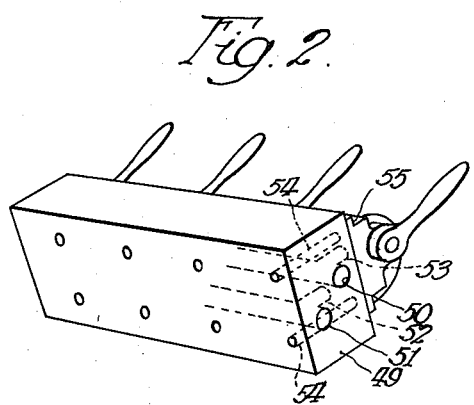
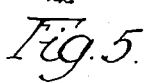
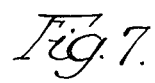
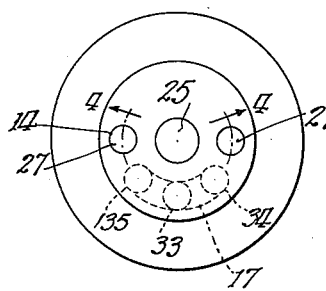
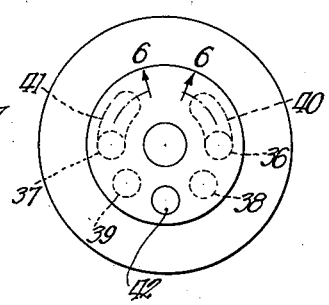
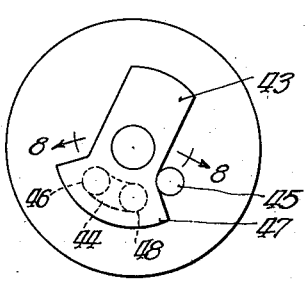
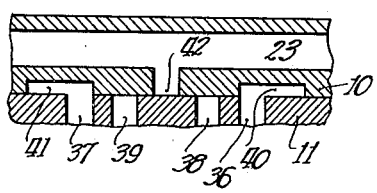
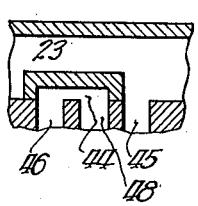
Inventor
Victor W. Peterson
Roland C. Rehm
Atty.

Patented May 26, 1936

2,042,186

UNITED STATES PATENT OFFICE 2,042,186

VALVE CONSTRUCTION

Victor W. Peterson, Chicago, Ill., assignor to Hannifin Manufacturing Co., Chicago, Ill., a corporation of Illinois Application July 13, 1932, Serial No. 622,192

1 Claim. (Cl. 251—87)

This invention relates to valve construction, and among other objects aims to provide an efficient and simple disc valve which will permit simplified pipe connections and which is adapted for mounting on a manifold.

The nature of the invention may be readily understood by reference to one illustrative construction embodying the invention and shown in the accompanying drawing.

In said drawing:

Fig. 1 is a vertical axial section of a valve;

Fig. 2 is a perspective view showing the mounting of a plurality of valves on a manifold;

Figs. 3, 5 and 7 show plan views, more or less diagrammatic in character, of a plurality of different arrangements to secure different valve operations; and Figs. 4, 6 and 8 are respectively fragmentary sections taken on the curved lines 4—4, 6—6, and 8—8 respectively of Figs. 3, 5 and 7, to show the arrangement of ports and passages.

The illustrative disc valve requires no packing and effects the necessary valve operations (with maximum port openings) with a relatively small angular movement of the valve disc, from 45° to 90° in the present instance depending on the character of valve operations desired. The valve is thus particularly suited for use as an air control valve for various types of apparatus to effect quick and efficient port opening and closing. The convenient mounting of such valves with a minimum of lateral pipe connections is important to permit the valves to be positioned for convenient operation (without interfering pipe connections) and also to permit a plurality of valves to be located closely adjacent each other where they may be easily operated by a single operator.

As illustrated more particularly in Fig. 1, the illustrative valve comprises a rotary disc 10 operating upon a valve body 11 having a flat valve seat 12 which is lapped with the face 13 of the disc to secure perfectly fitting surfaces to prevent leakage. The ports 14 in the valve seat have a circular or arcuate arrangement about the axis of the disc and are respectively connected by passages 15 all of which pass out of one face 16 (in this case the base) of the valve body. The base face 16 is made flat both for mounting and ready connection with conduits. The number and arrangement of the ports in the valve seat obviously depend upon the particular function which the valve is to serve. Generally such ports comprise an exhaust port, an air supply or inlet port, and one or more outlet ports adapted to be connected with an air cylinder or other apparatus controlled by the valve.

The seating face 13 of the disc may be provided with an elongated recess 17 adapted to place two ports in the valve seat in communication. If desired the idle portions of the disc face may be recessed to simplify the lapping of the disc to its seat.

The valve disc and its seat are enclosed by a housing 18 whose flanges 19 fit and are tightly screwed against the marginal flange 20 of the valve body to prevent leakage. Air or other fluid under pressure is conducted to the valve through the passage 21 in the housing, which passage opens on the face 22 of the housing which together with the face 16 of the valve body, in this case constitute the bottom or base face of the valve. The passage 21 communicates with the space 23 on the interior of the housing opposite the back of the valve disc. The air or other fluid pressure thus conducted to the valve disc serves to hold it tightly against its seat. Preferably a spring 24 seated over the boss 25 on the valve disc and within the recess 26 of the housing serves to hold the disc against its seat during periods when no pressure is on the valve in order to prevent the entrance of foreign particles between the contacting faces 12 and 13 of the valve seat and valve disc.

Pressure from the space 23 behind the valve disc is delivered to the respective ports by rotation of the disc to uncover the desired port in the valve seat. As shown in Figs. 3 and 4 this is effected by one or more ports 27 in the valve disc, depending upon the particular functions which the valve is to perform. The valve disc is rotated in the present instance by a stem 28 having a non-circular extremity 29 which fits in a correspondingly shaped recess 30 in the face of the valve disc. As here shown the stem is shouldered at 31 to prevent its withdrawal from position, there being no physical connection between the stem and the disc beyond the mere seating of the end of the stem in the recess of the disc. This prevents the connection of the stem with the disc from disturbing the tight seating of the valve disc. A handle 32 on the valve stem permits ready operation of the valve disc. It will be noted that the valve stem and its connection with the disc involve no packing since the seal which prevents escape of pressure fluid along the valve stem is provided by the seating of the valve disc itself against the surface 12 in a continuous region around the valve stem.

In the foregoing construction the valve inlets and outlets all open on one face or side of the valve, in the present case on the base of the valve. This permits simple connection of the valve to the pipes leading to and from the valve. No pipes enter or leave from any other sides of the valve to complicate connection or to interfere with its manipulation.

In Figs. 3 to 8 are shown a number of exemplary arrangements for securing different valve operations. In Figs. 3 and 4 the valve seat is provided with three ports 33, 34 and 35, the latter two of which may for example be connected with the opposite ends of a cylinder controlled by the valve. The intermediate port 33 may serve as an exhaust port. The valve disc 10 is provided with a pair of air pressure ports 27, and an intermediate passage 17 adapted to place ports in the valve seat in communication. The foregoing design permits the selective introduction of pressure through a port 27 with either of the ports 34 or 35 and simultaneous connection of the other port through the passage 17 with the exhaust port 33. Also when the valve disc is positioned as shown in Fig. 4, pressure is cut off from cylinder ports 34 and 35 and the latter are simultaneously connected with the exhaust, thus permitting the exhausting of both ends of the cylinder. A valve of this type may advantageously be used to control an air operated chuck on a lathe or the like. The operator may actuate the chuck by moving the valve to admit air to the chuck operating cylinder, in which position of the valve the air pressure will be maintained on the chuck without further attention by the operator, notwithstanding leakage past the piston. It is not possible to set the valve in a neutral position without releasing the air from the chuck. This protects the operator from release of the work in the chuck through leakage.

In Figs. 5 and 6 the valve seat 11 is provided with a pair of intermediate ports 38 and 39 adapted to be connected for example, to the opposite ends of the cylinder. The valve disc 10 is provided with a pair of port connecting passages 40 and 41 and an intermediate inlet port 42. The foregoing arrangement permits the following selective operations: the placing of the port 39 in communication with inlet 42 and the simultaneous connection of the port 38 with the exhaust port 36 through the passage 40; a similar arrangement for port 38; and, as illustrated in Fig. 6, a closing of all ports thus holding one or the other of the ports 38 and 39 and the corresponding end of the cylinder under the pressure introduced therein without resulting in operation of the cylinder. This type of valve may be used for arbor presses and the like and stationary double-acting air cylinders. It enables the operator to admit a partial volume of air to the air cylinder and to return the valve to neutral position or later to admit more air, without losing the volume of air previously admitted.

In Figs. 7 and 8 is illustrated a valve for simple operations, which require only an oscillation of 45° to carry the same through a complete cycle. In the present case the valve disc 43 is of sector or fan shape instead of circular configuration as shown in Figs. 3 and 5, and carries only a single port connecting passage 44. Pressure fluid from the space behind the valve disc may reach either of the ports 45 or 46 when the sector element 47 of the valve is moved to uncover one or the other ports 45 and 46. As here shown when one port is thus uncovered to be placed in communication with pressure fluid, the other port (46 in the present case) is opened to the exhaust port 48 in the valve seat through the passage 44. In this arrangement a small oscillation of the valve disc through only 45° places one cylinder port in communication with pressure and connects the other one simultaneously with exhaust. Upon a return movement of the valve the reverse operation takes place.

In this type of valve there is no neutral or "shut-off" position, air pressure always being on one or the other side of the cylinder. It may be advantageously used wherever a neutral valve position is not necessary.

The foregoing are merely illustrations of various designs for securing specific valve cycles.

The above valve is admirably adapted for mounting on a manifold with a plurality of similar valves, as illustrated in Fig. 2. In the present case the manifold 49 embodies a single air pressure passage 50 and a single exhaust passage 51 which by means of cross passages 52 and 53 in the manifold may be placed in communication with each of the several valves mounted on the manifold. The manifold also contains transverse passages 54 which register with the cylinder ports in the base of the valve and are adapted to be connected with pipes to the several cylinders or other apparatus controlled by the air valve. The respective valves are bolted to the manifold by bolts passing through the base flanges 55 of the valve. As shown in Fig. 2, it is possible to place a plurality of valves in close proximity so that they may be easily and quickly operated by a single operator by means of simple pipe connections which may be readily made and are remotely located so as not to interfere with the operation of valves.

Operation of the valve not only requires but a small movement but little force to effect such operation. Moreover the force to start the valve is low as compared to other types of valves. The foregoing admirably adapts the valve to automatic operation by simple actuating mechanisms not heretofore appropriate because of low power or limited range of movement.

Obviously the invention is not limited to the details of the illustrative construction since these may be variously modified. Moreover, it is not indispensable that all features of the invention be used conjointly, since various features may be used to advantage in different combinations and subcombinations.

Having described my invention, I claim:

A disc valve of the character described comprising in combination a valve body having a base and a flat seat along one side and at right angles to said base, inlet and exhaust passages provided with ports in said seat and opening in said base, a valve disc seated on said seat and controlling the ports therein, a cover over said disc and secured to said body to enclose said disc, said cover having a base flush with said valve body base and having an inlet passage leading from the cover base to the interior of said cover to conduct air under pressure to the back of said disc to hold the same on its seat, said body base and cover base constituting a base face for said valve and all of said passages opening through the said base face, said valve being rotatable to uncover one or more ports in said seat to admit air under pressure thereto, and a valve stem passing through said body and engaging said disc to rotate the latter, said stem being separate from said valve disc but having an operating connection therewith whereby said disc may seat independently of said stem, said disc and seat being lapped entirely around said stem to prevent leakage along said stem.

VICTOR W. PETERSON.